Jan. 21, 1958 W. J. BICKFORD 2,820,893
C. W. CALIBRATOR
Filed July 14, 1953
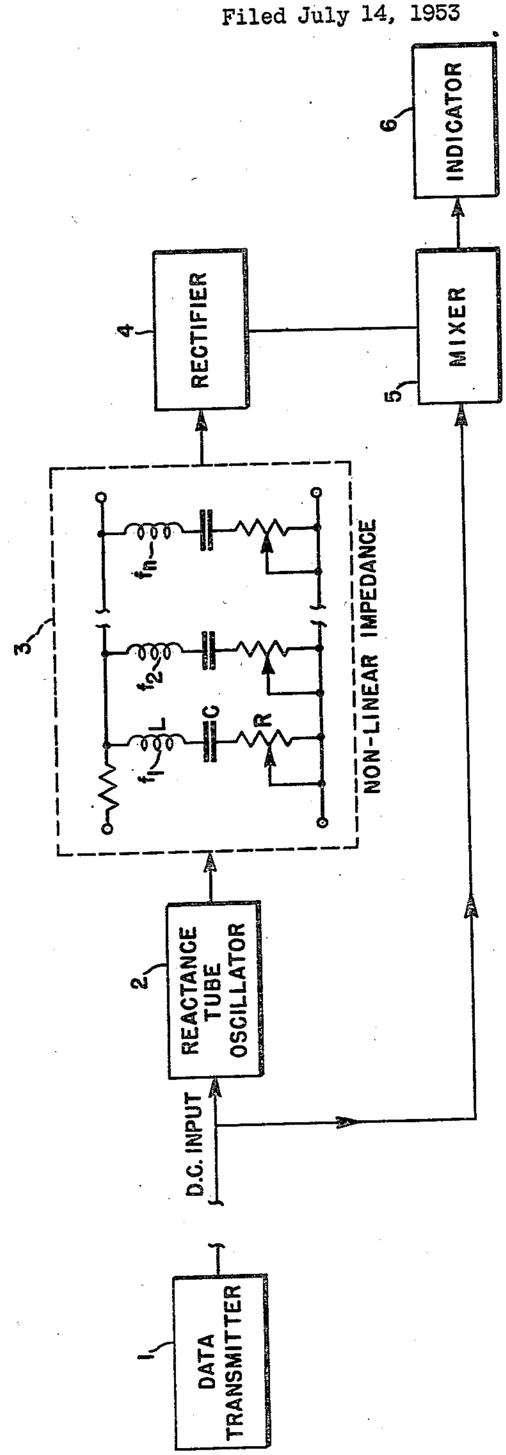
INVENTOR
WILLIAM J. BICKFORD
BY W. R. Maltby
D. C. Snyder
ATTORNEYS United States Patent Office 2,820,893

Patented Jan. 21, 1958

2,820,893

C. W. CALIBRATOR

William J. Bickford, Waltham, Mass., assignor, by mesne assignments, to the United States of America as represented by the Secretary of the Navy Application July 14, 1953, Serial No. 367,963

6 Claims. (Cl. 250—27)

The present invention relates generally to data transmission systems and more particularly to a calibrating circuit for compensating for the known nonlinearity of the various measuring instruments employed therein.

In telemetering systems of the type wherein the incoming data signals at the receiver are processed by automatic calculating equipment, such as, for example, digital computers, the conversion of these signals into binary code form is considerably simplified if a linear relationship exists between these signals and the intelligence they represent. Since most of the end measuring instruments found in the transmitters of such telemetering systems generally developed output signals whose amplitudes are a nonlinear function of the physical quantity being measured, some provision, therefore, must be made at the receiver for correcting this deficiency before advantage can be taken of the above relationship.

It is accordingly a primary object of the present invention to provide a calibrating circuit which will correct for the known nonlinearity of variable amplitude data signals derived from a telemetering transmitter in a data transmission system.

A second object of the present invention is to provide a circuit arrangement for modifying the intelligence signals in a telemetering channel to establish a linear relationship between these signals and the physical quantities they represent.

A still further object of the present invention is to provide a calibrating circuit fo raltering the amplitudes of intelligence signals in a telemetering system by amounts depending upon the known nonlinearity of the various circuits and components preceding the final utilization equipment.

A further object of the present invention is to provide a circuit arrangement for varying the amplitudecs of unidirectional signals by amounts representing the nonlinearity of a remote measuring instrument from which these signals are derived.

Other objects and many of the attendant advantages of this invention will be readily appreciated as the same become better understood from the following detailed description and by reference to the drawing, the single figure of which shows a preferred embodiment of the present invention.

Briefly, and in general terms, the solution as proposed by the present invention involves splitting the incoming, uncorrected data signals, which in the present instance are of a unidirectional nature, into two separate channels at the receiver. The data signals in the first channel are converted to substantially constant amplitude, alternating current signals, the frequencies of which are governed by the amplitudes of the above data signals. These alternating current signals have their amplitudes modified by the nonlinear impedance of a circuit network comprised of a plurality of parallelly connected series resonant circuits. The impedance of this network varies with frequency in substantially the same manner as the amplitudes of the unidirectional data signals depart from linearity with respect to the physical quantity they represent. Thus, the output level at any particular frequency is proportional to the correction voltage required for the input data signal amplitude which produces the particular frequency. The output of this impedance network is therefore rectified and combined with the unidirectional current data signals in the second channel to give the desired calibrated signals.

Referring now to the drawing, a conventional data transmitter, having as one of its constituent components an end measuring instrument that generates a unidirectional signal whose amplitude is a nonlinear function of the quantity being measured, is generally represented by reference character 1. The output of this transmitter can be connected to the receiving equipment either directly via a suitable conductor or indirectly via a radio link. In the latter case, appropriate detecting equipment is necessary at the receiver for reproducing the variable amplitude, unidirectional data signals originally developed by the above end measuring instrument. At the receiver, the incoming data signals are coupled via a first channel to a conventional frequency modulator 2. This modulator in its simplest form may consist of a reactance tube oscillator with the above data signals coupled to a control grid thereof. Oscillator 2, as is well known in the art, functions to convert the variable amplitude, unidirectional data signals into variable frequency signals of substantially constant amplitude. The output of this oscillator is fed to the input terminals of a nonlinear impedance network, generally represented by reference character 3. This network is designed to exhibit an impedance whose magnitude varies with frequency in substantially the same manner as the amplitudes of the data signals depart from linearity. To obtain this nonlinear impedance characteristic, a plurality of series resonant circuits, inductors L and capacitors C, tuned to different frequencies $f_1, f_2, \ldots f_n$, within the frequency band generated by oscillator 2, are connected in a parallel relationship. The number of series resonant circuits forming this network is governed in part by the width of the frequency band through which oscillator 2 works and in part by the nonlinearity of the specific end measuring instrument employed in the data transmitter and the degree of accuracy desired. Associated with each of these resonant circuits and in a series relationship therewith is a variable resistor, R, whose magnitude is set at a predetermined value in accordance with the practice hereinafter set forth.

The alternating signals present in the output circuit of this impedance network, which now have variable amplitudes, are subjected to rectification in a conventional rectifying circuit 4; and the resultant unidirectional signals are fed to mixing circuit 5. Also coupled to this mixer and providing a second input signal are the unidirectional data signals present in the second channel. Mixing circuit 5 can take the form of a dual cathode follower having a common cathode resistance with the various input signals coupled to the respective control grids thereof. The output signals appearing across the common cathode resistor have a magnitude equivalent to the algebraic sum of the individual input signals and these signals correspond to the linearized, calibrated voltages desired.

It will be appreciated that the magnitude of the impedance exhibited by electrical network 3 at any particular frequency is determined for the most part by the size of the resistance in series with the resonant circuit tuned to that frequency. Consequently, the procedure for obtaining the desired impedance characteristic of network 3 involves primarily setting the magnitudes of the variable resistors R in accordance with the following practice. For the specific end measuring instrument in use at the transmitter, a calibration curve is made showing the amount by which the amplitudes of typical data signals depart from linearity. Next, the frequency response characteristic of modulator 2 for different levels of input signal corresponding to these data signals is plotted. Thereafter, uncorrected data signals of known amplitudes are coupled to the modulator. Since the particular frequency of each alternating current signal produced by these data signals and the amount of signal correction required by these data signals are known from the above curves, it is only necessary that the resistors associated with the various resonant circuits tuned to these frequencies be adjusted until the proper signal levels appear in the output circuit of network 3. If these adjustments are made over the working range of the end instrument, it will be found that the impedance characteristic exhibited by network 3 has a shape similar to the correction curve of the end instrument being calibrated. Since the output signals from network 3 correspond to the correction voltages required by the original data signals, the former signals are rectified and combined with the signals available in channel 2. The signals resulting from this addition, therefore, have amplitudes which are a linear function of the quantity being measured at the remote transmitter.

Any amplitude modulation introduced into the system by frequency modulator 2 can either be corrected by appropriate amplifying and limiting circuits or compensated for in the nonlinear impedance network 3. In the latter instance, of course, the technique for determining the settings of the variable resistors R remains substantially the same. Also, the interaction between the individual series resonant circuits can be kept at a minimum by designing these circuits to exhibit high impedance except within the narrow frequency band to which they are tuned.

It will thus be seen that the present circuit arrangement provides continuous correction throughout the input signal range and that this correction is achieved by utilizing individual controls which are mutually independent. Obviously, many modifications and variations of the present invention are possible in the light of the above teachings. It is therefore to be understood that within the scope of the appended claims the invention may be practiced otherwise than as specifically described.

What is claimed is:

1. In a calibrating circuit the combination of means for producing data signals having amplitudes which depart from a linear relationship with respect to the intelligence they represent by a particular function, means responsive to the instantaneous amplitude of said data signals for producing variable frequency signals of substantially constant amplitude, impedance means varying in magnitude with frequency in accordance with said function, means for applying said variable frequency signals to said impedance means to produce correction signals of varying amplitude and means combining said correction signals with said data signals to produce calibrated signals whose amplitudes are a linear function of said intelligence.

2. In a calibrating circuit the combination of a measuring instrument for producing data signals having amplitudes that depart from linearity by a particular function, means responsive to the amplitude of said data signals for producing variable frequency signals of constant amplitude, an electrical network having an impedance varying in magnitude with frequency in accordance with said function, said network including a plurality of parallelly connected resonant circuits tuned to certain of said frequencies, means for applying said variable frequency signals to said network to produce correction signals of varying amplitude and means for combining said correction signals with said data signals to produce calibrated signals whose amplitudes are a linear function of said quantity.

3. A calibrating circuit for use in a data transmission system comprising in combination, means for generating direct current data signals having amplitudes which depart from linearity by a particular function, a reactance tube oscillator responsive to said data signals for producing variable frequency signals of substantially constant amplitude, an electrical network having an impedance varying in magnitude with frequency in accordance with said function, means for applying said variable frequency signals to said network to produce correction signals of varying amplitude, means for rectifying said correction signals and means for combining the resultant direct current signals with said data signals to produce calibrated signals whose amplitudes are a linear function of said intelligence.

4. A calibrating circuit for use in a data transmission system comprising in combination an instrument for producing data signals having amplitudes that depart from a linear relationship with respect to the intelligence they represent by a particular function, a frequency modulator responsive to said data signals for producing variable frequency signals of constant amplitude, an electric network exhibiting an impedance varying in magnitude with frequency in accordance with said function, said electric network consisting of a plurality of series resonant circuits connected in a parallel relationship and tuned to certain of said frequencies and variable resistance means in series with each of said circuits, means for applying said variable frequency signals to said network to produce correction signals of varying amplitude, a mixing circuit, means for coupling said correction signals and said data signals to said mixing circuit to produce calibrated signals whose amplitudes are a linear function of said intelligence.

5. In a calibrating circuit the association of means for producing unidirectional data signals having amplitudes that depart from a linear relationship with respect to the intelligence they represent by a particular function, a reactance tube oscillator responsive to said data signals for producing alternating current signals whose frequencies are dependent upon the amplitudes of said data signals, an electric network having an impedance varying in magnitude with frequency in accordance with said function, means for applying said variable frequency signals to said network to produce alternating current correction signals of varying amplitude, means for rectifying said correction signals, a mixing circuit having input and output circuits, means for coupling the rectified correction signals and said data signals to said input circuit whereby calibrated signals whose amplitudes are a linear function of said intelligence are produced in said output circuit.

6. In a calibrating circuit as defined in claim 5 wherein said electrical network includes a plurality of parallelly connected series resonant circuits tuned to different frequencies within the frequency band generated by said frequency modulator and variable resistors associated with each of said resonant circuits for varying the impedance of said series resonant circuits.

References Cited in the file of this patent

UNITED STATES PATENTS

| | | |
|---|---|---|
| 2,579,223 | Baker | Dec. 18, 1951 |
| 2,607,851 | Pfleger | Aug. 19, 1952 |
| 2,692,333 | Holmes | Oct. 19, 1954 |